Patented May 4, 1943

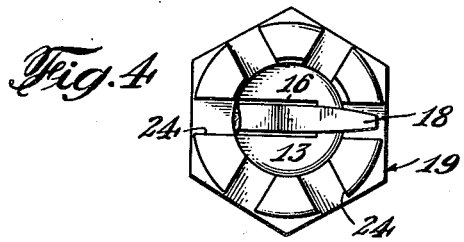
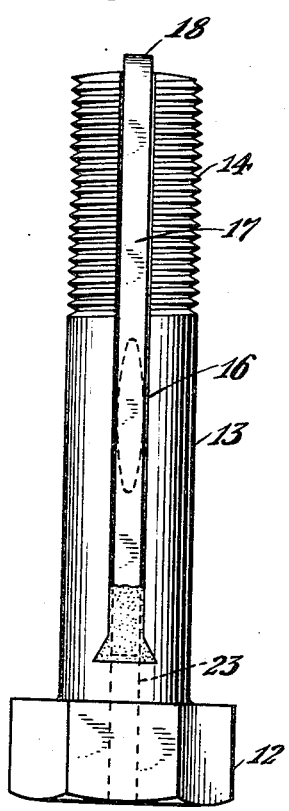
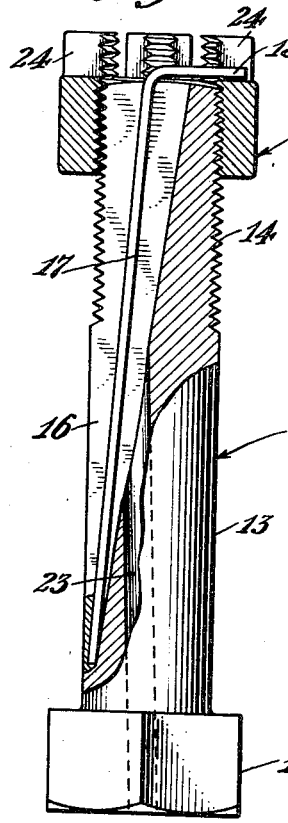
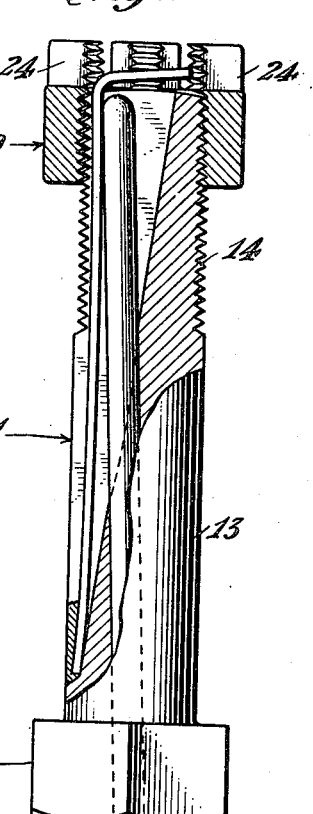
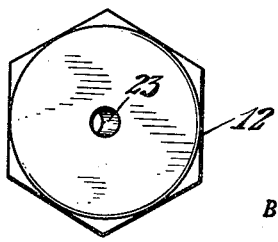

2,318,356

UNITED STATES PATENT OFFICE 2,318,356

SPRING LOCKING SCREW BOLT

Oscar Ball, Hewlett, N. Y.

Application June 5, 1942, Serial No. 445,928

5 Claims. (Cl. 151—8)

The present invention relates primarily to a locking device and more particularly to an improved arrangement for temporarily locking nuts to bolts whereby when the same are once installed in place on the bolts, they are prevented from jarring or rattling loose while at the same time permitting the locking means to be readily disabled when desired to permit easy removal of the nuts from the bolts.

The principal object of the present invention is to provide an improved novel and efficient arrangement of locking a nut to a bolt which is easily and readily operable and which when operated provides a positive lock for the nut.

Another object of the invention is to provide a nut locking means which is easily disabled to permit removal of the nut from the bolt.

Still another object of the invention is to provide a nut locking means which is controlled from the head end of the bolt as distinguished from the usual method of nut locking devices which are controlled from the threaded end of the bolt. When the locking means is controlled in the above manner from the head end of the bolt, cap nuts may be employed instead of the usual castellated nuts. When cap nuts are employed, the removal of the nut from the bolt by an unauthorized person cannot be accomplished without considerable difficulty unless access to the head of the bolt is provided.

A still more specific object of the invention is to provide a nut locking arrangement which is not permanently deformed when employed to lock the nut to the bolt but may be reused time and time again.

The above and further objects of the invention will be more apparent hereinafter in the detailed description of the invention when taken in conjunction with the accompanying drawing in the latter of which:

Fig. 1 is an elevational view of a bolt incorporating therein a nut locking means arranged in accordance with the teachings of the present invention;

Fig. 2 is an elevational view of a bolt and nut partly in section, showing the nut locking means in an operated position;

Fig. 3 is a view similar to Fig. 2 showing the manner in which the nut locking means is disabled to permit placing of the nut on the bolt or the removal of the nut from the bolt;

Fig. 4 is a plan view of the nut and bolt from the threaded end of the bolt; and Fig. 5 is a view of the head end of the bolt.

For the purpose of illustrating the present invention the principles thereof are shown and hereinafter described as being applied to a machine bolt of a well known type, and it should be kept in mind that although the invention is described as being applied to this particular type of bolt, it is not limited in its application to one type of bolt but may be applied to practically all types.

The bolt is indicated in general by reference numeral 11 and includes a head 12, a neck portion 13, and a threaded portion 14. Formed in the threaded portion 14 and in the neck of the bolt 13 is a flat bottomed groove, keyway or slot 16. The groove 16 extends from the threaded end of the bolt to a point adjacent the head 12 in a bolt of the length such as that shown in the drawing. In bolts of different lengths and diameters the groove 16 would be of a different length relative to the length of the bolt. At the upper end of the bolt as shown in the drawing the depth of the groove 16 is slightly more than half the diameter of the bolt and the depth decreases progressively toward the head of the bolt.

Located in the groove 16 is a key 17. In the preferred embodiment of the invention the key 17 is rectangular in cross section and has the upper end thereof bent at an angle of approximately 90° so that the upper projecting end 18 extends to the right as shown in Figs. 2 and 3 across the threaded end of the bolt 11. The lower end of the key 17 is fixed to the neck 13 of the bolt by some means such as welding, and at the point of welding the bolt neck has the excess metal removed so that the neck is circular in cross section.

The key 17 is preferably made of a reasonably hard material such as spring steel and has some resiliency. The key 17 is biased by means of its resiliency so that the upper end 18 thereof normally extends an appreciable amount beyond the outer diameter or periphery of the threaded end of the bolt 11. The length of the section 18 of the key 17 is slightly less than the diameter of the threaded end of the bolt so that when the key is moved to the left in a manner hereinafter described, the section 18 will not interfere with the threading of a nut on the bolt.

When it is desired to place a nut such as 19, Figs. 2, 3 and 4, on the bolt, the section 18 of the key must be moved to the left as shown in Fig. 3 so that it does not protrude beyond the outside of the threads of the bolt. The movement of the upper end 18 of the key to the left as shown in Fig. 3 is controlled by a release pin 21 having a handle portion 22 bent at right angles to the longer section thereof. A hole 23 slightly greater in diameter than release pin 21 is drilled from the center of the head 12 of the bolt up through the neck 13 and into the groove or slot 16. The hole 23 is drilled at a slight angle to the axis of the bolt and enters or merges with the groove 16 at a point in approximately the longitudinal center thereof.

On inserting the release pin 21 in the hole 23, the upper end thereof engages the central and upper portion of the key 17 and is effective to flex the key 17 by a wedging or camming action to the left as shown in Fig. 2, which flexing of the key moves the section 18 thereof to the left and withdraws the section 18 from extension beyond the outer diameter of the threaded end of the bolt. With the section 18 in its retracted position such as shown in Fig. 3, a nut 19 may be threaded onto the bolt 11. In the drawing a castellated nut 19 is shown of the usual type with radially extending grooves or slots 24 formed in the upper portion thereof. After the nut 19 is threaded on the bolt 11 the proper amount and tightened in place to clamp material not shown together by means of the bolt and nut, the release pin 21 is withdrawn from the hole 23. The withdrawing of the release pin 21 permits the upper section 18 of the key 17 to move to the right as shown in Fig. 2 by virtue of the resiliency of the key, whereupon the end of the section 18 thereof enters one of the grooves or notches in the upper portion of the nut 19 to lock the same in place. If one of the grooves in the nut 19 is not in operative relation with the end of the section 18 of the key 17, which is slightly tapered to facilitate entrance of the end of the section 18 into the groove, a slight turning of the nut in either direction brings a groove into operative relation with the section 18 whereupon it will snap into the groove to prevent further rotation of the nut relative to the bolt in either direction. Thus the nut 19 may be securely locked in position on the bolt and removal thereof is prevented as long as the section 18 remains engaged with one of the grooves 24 thereof.

To remove the nut 19 from the bolt 11, the release pin 21 is reinserted in the hole 23 and caused to engage and flex the key 17 to withdraw the section 18 from out of a groove in the nut 19. Thereupon the lock on the nut is removed and the nut may be removed from the bolt. From the above arrangement it is seen that a nut locking device is provided which positively locks a nut in place on the bolt and which may be easily disabled to permit removal of the nut at the desired time. As there is no permanent disfiguration of the locking element in either the installation or removal of a nut from the bolt, the locking means may be used over and over again. Such an arrangement has obvious advantages where a simple and easily operated locking device for a nut is desired and is especially advantageous where the nut may be removed and replaced more or less frequently.

By the employment of a cap nut, instead of the castellated nut 19 shown in the drawing, with proper recesses formed for the reception of the end 18 of the key in the cap nut, removal of the cap nut by unauthorized persons is prevented or cannot be accomplished without considerable difficulty. Another feature of the invention is that the disabling of the locking means is controlled from the head end of the bolt which eliminates complications and elements from the threaded end of the bolt. Such an arrangement has certain obvious advantages when it is desired to prevent unauthorized removal of nuts from bolts where the head of the bolt is inaccessible to the unauthorized persons.

It is obvious, of course, that various modifications of the invention may be made without departing from the spirit or essential attributes thereof, and it is desired, therefore, that only such limitations be placed thereon as are imposed by the prior art or are specifically set forth in the appended claims.

What is claimed is:

1. In a screw bolt having a longitudinally extending groove therein, said groove being at an oblique angle to the axis of said bolt, a longitudinally extending spring member located in said groove with one end permanently affixed to said bolt and having at the opposite end thereof an anterior extension of approximately the length of the diameter of the shank of said bolt, said extension being bent laterally to the anterior end of said groove to form a self-locating releasably locking portion normally extending laterally beyond the periphery of said bolt, an auxiliary operating channel formed of an auxiliary grooved bore extending longitudinally of said bolt and at an inclined plane into said groove to intersect the same, said auxiliary channel beginning at the head end of said bolt, a releasing member adapted to be inserted in said auxiliary channel to engage said spring member and flex the same to move the locking portion thereof into an extension of the periphery of said bolt to thereby permit a nut to be threaded on or removed from said bolt.

2. The combination with a castellated nut and a threaded bolt, said bolt having a channel formed therein and extending from the threaded end of said bolt to an intermediate point, said channel containing a longitudinal spring member having a laterally extending portion at one end thereof normally extending beyond the periphery of said bolt to thereby lock the nut on said bolt, a second channel in said bolt extending from the head end thereof to said first channel, a pin engageable with said spring member by the insertion thereof in said second channel to force said spring member to withdraw the locking portion from extending beyond the periphery of said bolt and operative on the withdrawal of said pin and including the resiliency of said spring member to permit entrance of the locking portion thereof into grooves in said nut to lock said nut on said bolt.

3. In a screw-bolt having an oblique longitudinally extending groove therein, a spring member permanently affixed adjacent one end thereof to said bolt located in said groove and having an anterior extension approximating the length of the diameter of the shank of the said bolt, said spring extension being bent laterally at the anterior end of said groove to form a self-locating releasably locking spring pin extending laterally when unflexed beyond the bolt periphery, an auxiliary channel formed of an auxiliary grooved bore extending longitudinally and at an inclined plane inward from the head end of the said screw-bolt at a counter-inclined plane to the plane of the base of the said longitudinal groove, said auxiliary channel being formed to receive an auxiliary key member entering through the said operating auxiliary channel to exert thrust against said longitudinal spring member to move said self-locating spring pin into the periphery of said screw-bolt whereby the threading of a nut on said bolt is permitted.

4. The combination of a castellated nut and a screw-bolt, said screw-bolt having an auxiliary operating channel extending from the head end of said screw-bolt to a main longitudinal groove contained throughout the greater length of the shank of said screw-bolt, said main longitudinal groove containing a permanently affixed longitudinal spring member having a laterally extending locking pin at the anterior end thereof, said longitudinal spring member being normally biased to position said pin whereby the same partly extends beyond the bolt periphery, a releasing member, the release of said locking pin being accomplished by means of said releasing member introduced into the aforesaid auxiliary operating channel from the head end of said screw-bolt to flex said longitudinal spring member and withdraw said locking pin from extension beyond said bolt periphery thereby permitting the threading of said nut on said bolt, the withdrawal of said releasing member from the said operating auxiliary channel causing said locking pin to engage and lock the castellated nut to said bolt.

5. In a nut lock comprising a bolt having a threaded end portion with a longitudinal groove therein, said groove being at an oblique angle to the axis of said bolt with the greatest depth of said groove at the threaded end of said bolt, a locking key disposed in said groove and extending longitudinally thereof, said key being flexible and having a locking portion slightly less in length than the diameter of said bolt formed at substantially right angles to the axis of said bolt, said locking portion in a normal position extending beyond the periphery of said bolt, an opening in said bolt extending from the head end thereof into said groove at an angle thereto, a releasing pin, means including said releasing pin on the insertion in said opening from the head end of said bolt to engage and flex said locking key to move the locking portion thereof into the extension of the periphery of said bolt whereby a nut may be threaded on said bolt and operative on the removal of said releasing pin to permit engagement of said locking portion with said nut on said bolt to lock the same thereto.

OSCAR BALL.